United States Patent [19]
Herb et al.

[11] Patent Number: 5,651,650
[45] Date of Patent: Jul. 29, 1997

[54] ATTACHMENT ASSEMBLY WITH ANCHOR BOLT AND EXPANSION WEDGE

[75] Inventors: Armin Herb, Apfeldorf; Hubert Forster, Moorenweis, both of Germany

[73] Assignee: Hilti Aktiengesellschaft, Schaan, Liechtenstein

[21] Appl. No.: 645,316

[22] Filed: May 13, 1996

[30] Foreign Application Priority Data

May 11, 1995 [DE] Germany .................. 195 17 216.7

[51] Int. Cl.$^6$ .................. F16B 13/04; F16B 15/00
[52] U.S. Cl. .................. 411/78; 411/79; 411/358
[58] Field of Search .................. 411/75, 78, 79, 411/80, 357, 358

[56] References Cited

U.S. PATENT DOCUMENTS

| | | |
|---|---|---|
| 2,748,594 | 6/1956 | Edwards . |
| 4,275,637 | 6/1981 | Herb et al. .................. 411/79 X |
| 4,312,615 | 1/1982 | Herb .................. 411/78 |
| 4,892,450 | 1/1990 | Gerhard .................. 411/78 |
| 5,529,424 | 6/1996 | Neubert et al. .................. 411/78 X |

FOREIGN PATENT DOCUMENTS

| | | |
|---|---|---|
| 0283720 | 9/1988 | European Pat. Off. . |
| 9409853 | 10/1994 | Germany . |

*Primary Examiner*—Neill R. Wilson
*Attorney, Agent, or Firm*—Anderson Kill & Olick PC

[57] ABSTRACT

An attachment assembly formed of an anchor bolt (1) and an expansion wedge (2) with the anchor bolt having an outside surface (4) at its leading end in the setting direction and widening in a wedge-like manner. The expansion wedge (2) can be displaced axially along the wedge-like outside surface (4) for effecting expansion of the attachment assembly. At its trailing end (6), the anchor bolt (1) has a flange-like engagement part (5) for applying a load to a receiving material into which the attachment assembly is expanded. The engagement part (5) has a throughbore (3) through which the expansion wedge (2) extends and is secured in a preassembled state. The expansion wedge (2) has a trailing end section (14) extending rearwardly from the engagement part (5) in the preassembled state so that in the expanded state the expansion wedge is held in a press fit in the throughbore (3).

8 Claims, 2 Drawing Sheets

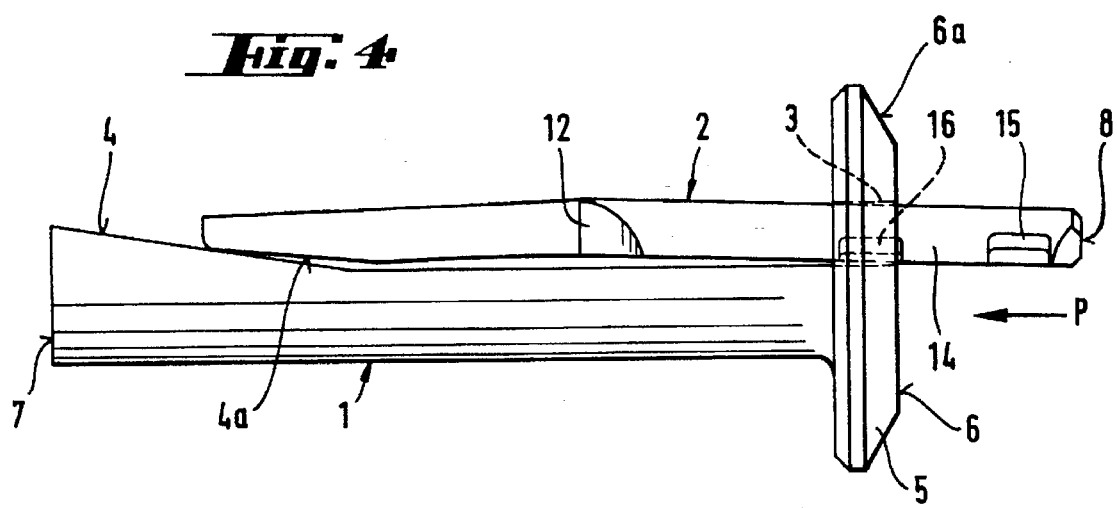
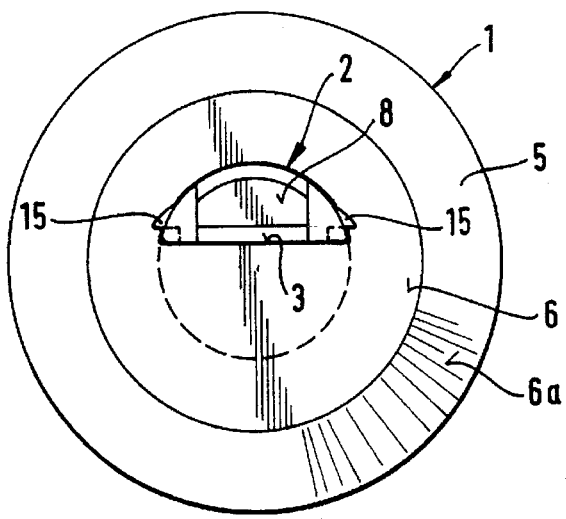
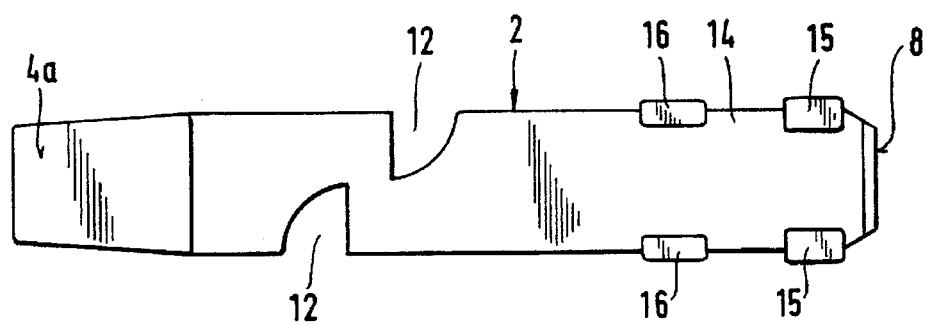
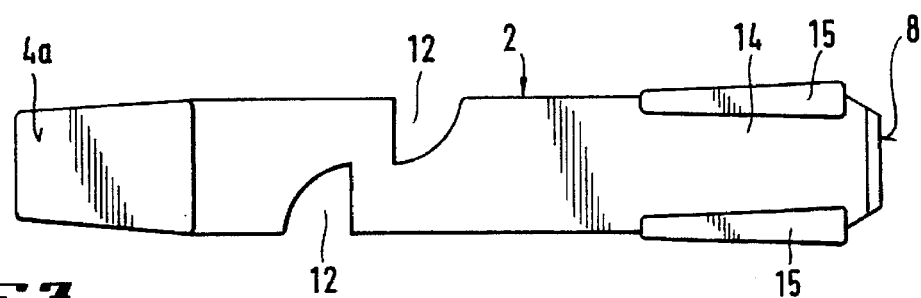

ATTACHMENT ASSEMBLY WITH ANCHOR BOLT AND EXPANSION WEDGE

BACKGROUND OF THE INVENTION

The present invention is directed to an attachment assembly formed of an anchor bolt and expansion wedge where the anchor bolt has an outside surface widening in a wedge-type shape manner at its leading end in the setting direction and forms a wedge surface along which the expansion wedge can be displaced in the setting direction for effecting the expansion of the assembly. The anchor bolt has a flange-like engagement part for applying a load located in its trailing end region. The engagement part has a throughbore for receiving the expansion wedge, wherein the expansion wedge is held in the pre-assembled state to the anchor bolt.

Attachment assemblies formed of an anchor bolt and expansion wedge are used mainly for securing intermediate ceilings, paneling, framework, pipes, cables and the like. Since these attachment assemblies are used in large quantities, they must be manufactured economically and must be set with only a small expenditure of time and without the use of special tools. The attachment assemblies are formed in such a way that one part is shaped as an anchoring bolt and serves to receive a load to be carried by the assembly. An expansion wedge can be displaced axially along a wedge surface on the anchor bolt in all of the known attachment assemblies. After the expansion has been effected, the attachment assembly is secured tightly in a prepared receiving bore, for instance, in a ceiling. If a force is applied to the anchor bolt, for instance, by a suspended load, an additional after-expansion of the attachment assembly takes place.

An attachment assembly is disclosed in EP-A-0,283,720 made up of an anchor bolt and expansion wedge. The anchor bolt has a wedge surface along which the expansion wedge can be displaced in the setting direction for expanding the attachment assembly, as well as an engagement part flange with a throughbore for guiding the expansion wedge. The expansion wedge has two projections which, during pre-assembly of the attachment assembly, that is, while assembling the anchor bolt and expansion wedge, serve for securing the expansion wedge relative to the anchor bolt in the throughbore. The projections extend at least partially radially beyond the surface of the throughbore in the engagement flange and are subjected, during the preliminary assembly of the expansion wedge in the anchor bolt, to a slight deformation due to the blocking process, when the projections in the setting direction of the attachment assembly come into contact with the surface of the throughbore in the engagement flange. In such an arrangement, the expansion wedge can tilt, so that its setting side and lifts off and becomes remote from the anchor bolt while projecting radially beyond the outside surface of the anchor bolt. An attachment assembly pre-assembled in such a way often cannot be inserted into a prepared receiving borehole, matched to the diameter of the anchor bolt, because of the remote portion of the expansion wedge. A disadvantage of such a known attachment assembly is that, in particular, when inserting it into a receiving bore in a ceiling, a self-induced retention or holding of the attachment assembly in the bore is not assured. Therefore, the operator must make sure up to the end of the setting stamp, that the attachment assembly is seated correctly in the receiving bore.

To remedy these disadvantages, it is proposed in EP-A-0620 347 to use an attachment assembly formed of an anchor bolt and an expansion wedge, where the expansion wedge is shaped arcuately, so that in the unexpanded state it only contacts the surface of the anchor bolt at a front end region and a rear end region. During preassembly, the expansion wedge of this proposed attachment assembly is displaced along the anchor bolt. The leading end region of the expansion wedge slides, at least partially, along the wedge surface of the anchor bolt. In this unexpanded position, the expansion wedge is secured to the anchor bolt by means of the flange-like part whereby the leading end region of the expansion wedge rests at the wedge surface of the anchor bolt. During insertion of this attachment assembly into a receiving bore matched to the diameter of the anchor bolt, a reverse deformation of the outwardly curved or arcuately shaped expansion wedge takes place. As a result, a pre-stressing force acting in the radial direction is developed with the attachment assembly retained in the receiving bore and particularly simplifies an overhead installation. While it is possible to counter the disadvantages of the previously known attachment assemblies in this way, even this attachment assembly can be further improved.

The expansion wedge in the improved attachment assembly is provided with a region of reduced wall thickness, so that during the setting process, a rear region of the expansion wedge can move forwardly relative to the front region, during the setting procedure, whereby the trailing end of the expansion wedge can be set so that its surface is flush with the flange-like engagement part. In hard concrete, the expansion forces of the receiving bore are often so high that the expansion wedge is sheared off during the driving process in the region of the reduced wall thickness acting as a rated shearing point. The special configuration of the shearing point permits the continued driving of the expansion wedge. When the shearing action takes place, the expansion wedge no longer is properly supported in the receiving bore and it may drop out of the throughbore. While this situation has no negative effect on the retention properties of the attachment assembly, it can cause problems for the tool operator if he determines that there is no longer a solid support in the receiving bore for the portion of the expansion wedge visible to him, or that portion drops out of the throughbore.

SUMMARY OF THE INVENTION

Therefore, it is the primary object of the present invention to improve a known attachment assembly, so that the above-mentioned disadvantages do not occur. An attachment assembly is provided where a secure support of the entire expansion wedge is assured even if the expansion wedge is sheared off in the course of setting the attachment assembly. The installed attachment assembly must not provide any problems to the user. The secure retention of the attachment assembly should be directly evident to the user. Moreover, the attachment member is to be manufactured simply and economically.

In accordance with the present invention, the disadvantages in the prior known attachment assemblies are overcome where the attachment assembly is formed of an axially extending anchor bolt and an axially extending expansion wedge. At its leading end region in the setting direction, the anchor bolt has an outside configuration widening in a wedge-shaped manner and forming a wedge surface along which the expansion wedge is axially displaced in the setting direction for carrying out the expansion procedure. The anchor bolt is provided with a flange-like engagement part for carrying a load at its trailing end region and the engagement part has a throughbore for the expansion wedge. The expansion wedge is secured to the anchor bolt in the pre-assembled state. The outside surface of the expansion wedge at its trailing end region extending outwardly from the engagement part is shaped so that in the expanded state the expansion wedge is retained with a pressed fit in the throughbore.

It is assured by the inventive arrangement of the attachment assembly that the expansion wedge is always securely held in place. If the expansion wedge, in the course of the setting procedure when it is driven in the setting direction, is sheared off at the rated shearing region, the expansion wedge ends up with its trailing end flush with the flange-like engagement part and is retained securely in the throughbore and cannot drop out. It is immediately evident to the user that an attachment assembly has been correctly installed, there is no reason to question the load carrying ability of the installed attachment assembly. Accordingly, the attachment assembly of the present invention is simple to install and economical to produce.

It is particularly easy to achieve a forced fit of the expansion wedge in the throughbore of the engagement part, if the axial projection of the trailing end region of the expansion wedge is located at least in part, radially outwardly of the projection of the throughbore. The region of the expansion wedge located radially outwardly of the axial projection of the throughbore preferably extends outwardly by approximately 10 µm to 50µm. Such projections are shown to be advantageous, since they do not result in a self locking effect during the driving of the expansion wedge, but they insure an adequate press fit in the expanded state.

In one embodiment of the present invention, the outside surface of the expansion wedge widens continuously towards its trailing end at least in one radial direction. When the expansion wedge is driven, the throughbore widens slightly. The radially extending surface which widens continuously towards the trailing end of the expansion wedge, assures a continuously renewed force or press fit in the throughbore of the engagement part and even increases the press fit. The widening of the expansion wedge can be arranged, in the pre-assembled unexpanded state, at the trailing end of the anchor bolt. This widened region acts as an additional security against the expansion wedge dropping out of the throughbore in its pre-assembled state.

In a significant embodiment of the attachment assembly which is particularly easy to fabricate, the trailing end region of the expansion wedge is provided with at least two radially outwardly extending projections. Two strap-like rear projections are provided in an advantageous manner located at opposite sides of the largest diameter of the trailing end region of the expansion wedge. These projections can be easily manufactured by squeezing the expansion member.

In another advantageous embodiment of the attachment assembly the trailing end region of the expansion wedge has at least one additional projection, arranged so that in the unexpanded state, it rests solidly against the surface of the throughbore. Preferably, two additional projections are provided which in the axial projection of expansion wedge are covered by the rearward projections, so that the rearward projections project radially outwardly from the additional projections by approximately 10µm to approximately 25µm. The additional strap-like projections have the function of providing additional security of the expansion wedge from falling out in the unexpanded state of the attachment assembly.

In a further advantageous embodiment of the invention, the expansion wedge is shaped arcuately so that in the unexpanded state it rests only at a leading end and trailing end region of the anchor bolt. As a result, the expansion wedge is held in the throughbore of the flange-like engagement part in the preassembled state with a press fit, and it is guaranteed that it will not become detached from the anchor bolt during storage and handling. The arcuate configuration of the expansion wedge has the further advantage that the anchor bolt and the expansion wedge have a slight oversize relative to a throughbore. In the course of overhead placement, the attachment assembly is secured against dropping out of a receiving bore.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWINGS

In the drawings:

FIG. 4 is a view similar to FIG. 1 of a second embodiment of an attachment assembly incorporating the present invention;

FIG. 5 is a plan view taken in the direction of the arrow P in FIG. 4 and shown at a larger scale;

FIG. 6 is an expansion wedge of the attachment assembly in FIG. 4; and

FIG. 7 is another embodiment of the expansion wedge as shown in FIG. 6.

DETAILED DESCRIPTION OF THE INVENTION

Figure 1:
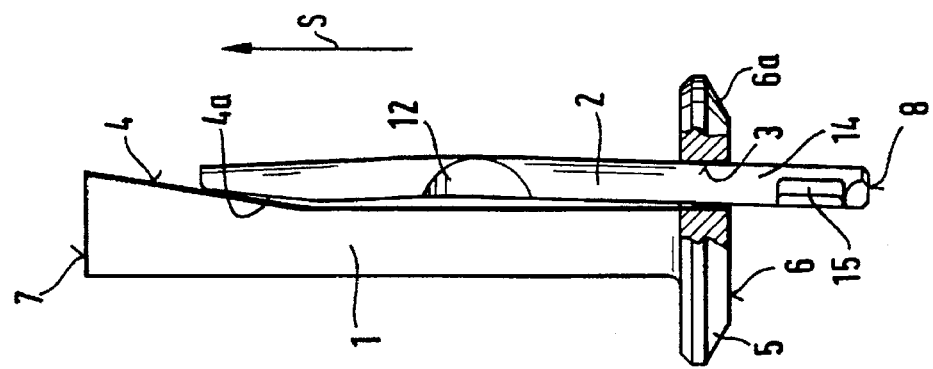
FIG. 1 is a side elevation view of one embodiment of an attachment assembly incorporating the present invention.
Figure 2:
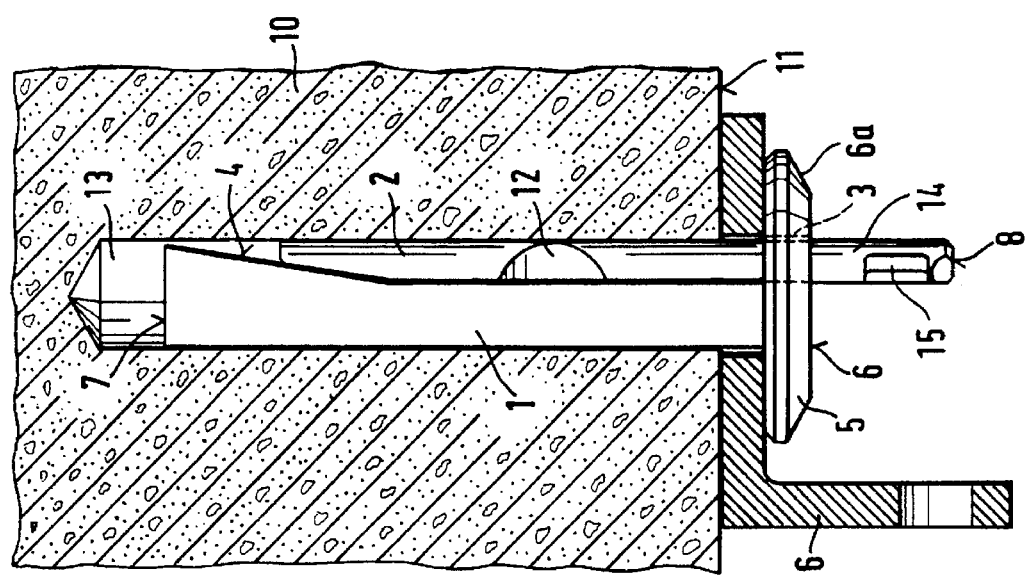
FIG. 2 illustrates the attachment assembly in FIG. 1 in the unexpanded state within a receiving bore.
Figure 3:
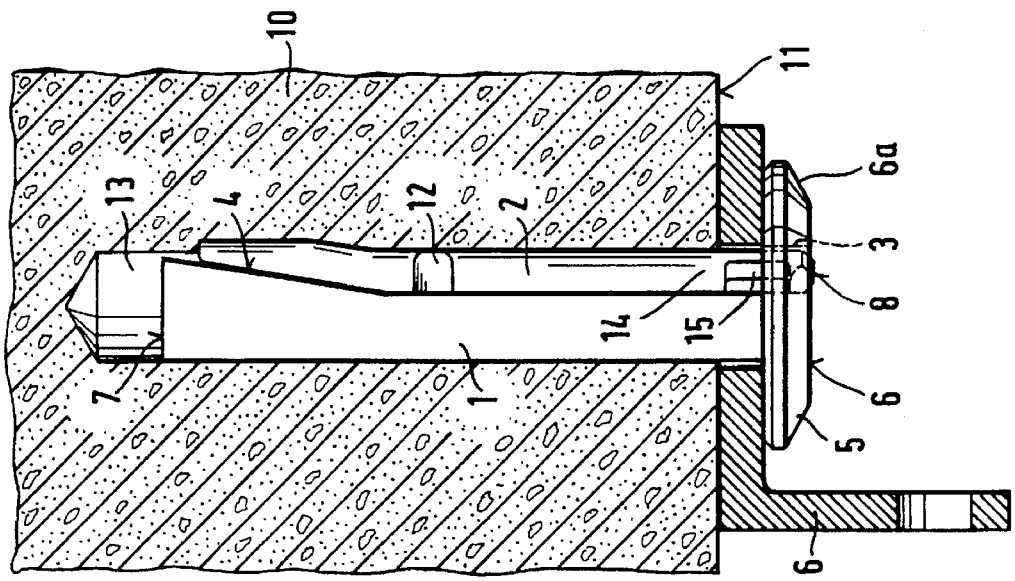
FIG. 3 is a view similar to FIGS. 1 and 2 displaying the attachment assembly in the expanded state within the receiving bore.

In the first embodiment of the invention shown in FIGS. 1, 2 and 3, the attachment assembly is formed of an axially extending anchor bolt 1 and axially extending expansion wedge 2. Both the anchor bolt 1 and the expansion wedge 2 have a leading end and a trailing end with respect to the setting direction S, note the arrow in FIG. 1. The leading end of each of the anchor bolts 1 and the expansion wedge 2 is the upper end as viewed in FIGS. 1, 2 and 3 and the trailing end is the lower end as viewed in these figures. Anchor bolt 1 has a flange-like engagement part 5 with a throughbore in its trailing end region 6 and the engagement part 5 serves for receiving and guiding the expansion wedge 2 which is displaceable relative to the anchor bolt during the expanding procedure. The engagement part 5 extends transversely outwardly from the surface of the anchor bolt 1. In its leading end region 7, the anchor bolt 1 has an outside surface 4, facing the expansion wedge 2 which has a wedge-shaped configuration in the axial direction and along which the expansion wedge 2 can be displaced in the setting direction S for effecting the expansion procedure. The expansion wedge 2 has a transverse cross section shaped as a semi circle and tapers towards its leading end to form an axially extending contact surface 4a matching the wedge surface 4 of the anchor bolt 1. In the pre-assembled state, the expansion wedge 2 is secured to the anchor bolt 1. As shown in FIG. 1, the expansion wedge 2 has an arcuate configuration in an axial direction so that its surface facing the anchor bolt is concave, whereby in the pre-assembled but unexpanded state it only contacts the anchor bolt in the leading end region and in the trailing end region 6. The largest clearance between the anchor bolt 1 and the expansion wedge 2 is preferably about 0.2 mm to 1.5 mm. In FIG. 1 the attachment assembly is in the pre-assembled state. The expansion wedge 2 projects through the throughbore 3 in the flange-like engagement part 5 and is retained by a press fit.

In FIG. 2, the pre-assembled, and unexpanded attachment assembly is shown inserted into a prepared bore 19 in a receiving material 10. A construction member 9 is shown between the leading end side of the flange-like engagement part 5 and the surface 11 of the receiving material 10. The diameter of the receiving bore 13 is essentially the same as the outside diameter of the anchor bolt 1. The arcuate expansion wedge 2 has been pressed with a prestress against the receiving bore 13. The expansion wedge 2 is prestressed in this way against the anchor bolt 1 so that only a very slight or no clearance remains between them. The attachment assembly is retained in the receiving bore by such prestress, and, as a result, cannot drop out of the receiving bore even in the case of overhead location of the receiving material 10. To this extent, the attachment assembly corresponds to the known attachment assembly disclosed in EP-A-0,620,374.

In accordance with the invention, the expansion wedge 2 of the attachment assembly 1 is equipped with radially extending projections 15 in its trailing end region 14 projecting axially outwardly from the flange-like engagement part 5 in FIG. 1 and FIG. 2. The projections 15 are formed by squeezing the material of the expansion wedge 2 and providing the shape of lugs projecting outwardly from the side surface of the expansion wedge 2. In particular, the projections 15 are shaped in such a way that the expansion wedge 2 is held in the expanded state with a press fit in the throughbore 3, as shown in FIG. 3. The expansion of the attachment assembly in the receiving bore 13 is achieved by means of the striking member not shown, such as a hammer, which strikes the trailing end of the expansion wedge 2 until the trailing end 8 is aligned flush with the trailing end side of the flange-like engagement part 5. For reliably achieving such a flush setting, the expansion wedge 2 is provided with a rated shearing region 12 between its leading end and the location of the flange-like engagement part 5, whereby the trailing end region 14 of the expansion wedge 2 can move forwardly in the setting direction when the attachment assembly is being placed in a hard receiving material 10. The flush alignment of the trailing end 8 of the expansion wedge 2 relative to the trailing end face of the anchor bolt 1 formed as a striking surface is an indication that the expansion procedure of the attachment assembly has been correctly completed. In the course of the forward movement of the expansion wedge 2, the projections 15 are driven into the throughbore 3 in the flange-like engagement part 5 and retained there by a press fit. In this manner, the trailing end of the expansion wedge is held securely in the event the expansion wedge 2 is sheared off, preventing the expansion wedge from falling out of the throughbore 3. An after-expansion of the attachment member is achieved by applying a load at the construction part 9.

In FIG. 4 another embodiment of the present invention is illustrated slightly modified as compared to the assembly shown in FIGS. 1–3. The reference numerals in FIG. 4 identify the same elements as in FIGS. 1–3. In this embodiment, two additional projections 16 are provided in the trailing end region 14 of the expansion wedge 2 in addition to the rearward projections 15 and these additional projections afford retention by a press fit in the throughbore 3 in the preassembled state of the attachment assembly. The additional projections 16 spaced axially forwardly of the rearward projections 15 are disposed essentially at opposite sides of the largest diameter of the expansion wedge 2 as is shown in FIG. 6. The rearward projections 15 extend radially beyond the forward projections 16 by a 10 µm to 25 µm. In this way, it is assured that the rearward projections 15 are retained by interference by a press fit in the throughbore 3 already widened by the forward projections 16.

In FIG. 7 a further embodiment of the expansion wedge 2 incorporating the present invention is displayed. The trailing end region 14 of the expansion wedge 2 is provided with two projections 15 in this embodiment each widening radially outwardly towards the trailing end 8 of the expansion wedge. The axial extent of the projections 15 is dimensioned so that the projections are already held in the throughbore 3 in the preassembled state of the attachment assembly. During the setting or expanding procedure, the expansion wedge 2 is driven in the setting direction through the throughbore 3. As a result, the throughbore 3 is widened, but at the same time the press fit is continuously renewed and even magnified by the projection 15 widening regularly toward the trailing end 8.

The additional projections 16 of the expansion wedge 2 displayed in FIG. 6 and the axial extent of the projection 15 of the expansion wedge 2 in FIG. 7, both provide the function of additional security against the expansion wedge 2 dropping out in the preassembled state of the attachment assembly of the present invention. In each of FIGS. 4, 6 and 7, a wedge-shaped contact surface 4a is shown at the leading end region of the expansion wedge 2. The rated shearing region 12 is located rearwardly of the wedge-shaped contact surface 4a.

In FIG. 5, a plan view of the attachment assembly of the present invention is illustrated in the direction of the arrow P in FIG. 4. The expansion wedge 2 of the attachment assembly can be formed in accordance with FIGS. 1–3, 6 and 7. It can be clearly seen that the projections 15 at the trailing end region of the expansion wedge 2 extend outwardly from the axial projection of the throughbore 3. In particular, the projections 15 extend beyond the projection cross-section of the throughbore 3 by approximately 10µm to 25µm. In the case of an expansion wedge according to FIGS. 4 and 6 the additional forward projections 16 project radially by a lesser amount and are covered by the rearward projections 15.

The attachment assembly of the present invention has been explained using the example of the expansion wedge 2 with the projections 15, 16 located opposite one another. It goes without saying that an expansion wedge could also provide individually disposed projections 15, 16. In embodiments where the expansion wedge has no projections but rather a trailing end region 16 widening toward the trailing end 8, is covered by the invention.

In FIGS. 1–5, a chamfered annular surface 6a is shown on the trailing end face of the flange-like engagement part 5. This annular surface extends radially outwardly from the trailing end region of the anchor bore formed as a striking surface 6. The chamfered annular surface 6a has the advantage, when the expansion wedge 2 is driven, that the striking member, does not act directly on the striking surface. The annular surface 6a can be used for placing legends which remain readable by the user even after the setting procedure has being achieved. The user can then easily recognize which type of attachment assembly forms the attachment point.

It is assured by the present invention that the expansion wedge 2 is always held securely in place. If the expansion wedge is sheared off while driven in the setting direction, the expansion wedge terminating flush with the flange-like engagement part 5 and secured in the throughbore cannot fall out. It is directly evident to the user that the attachment assembly has been correctly set and there is no reason to doubt the load carrying ability of the installed attachment assembly. The advantage of the simple pre-assembly is assured and the anchor bolt and the expansion wedge remain together as a unit. In a particularly advantageous embodiment, the advantage of the prestress during the setting of the attachment assembly into a prepared receiving bore is preserved, so that a self-acting retention of the inserted but not yet expanded attachment assembly is insured in receiving bores located in a ceiling or other overhead location. The attachment assembly of the present invention is simple to assemble and economical to manufacture.

While specific embodiments of the invention have been shown and described in detail to illustrate the inventive principles, it will be understood that the invention may be embodied otherwise without departing from such principles.

We claim:

1. Attachment assembly comprising an axially elongated anchor bolt (1) and an axially elongated expansion wedge (2), said assembly having a setting direction (S) and said anchor bolt and expansion wedge each having a leading end and a trailing end relative to the setting direction, said anchor bolt (1) having an axially extending outside surface including a leading end wedge-shaped region (7) widening towards said leading end and forming an axially extending wedge surface (4), said expansion wedge (2) arranged to be displaced along said wedge surface (4) for effecting expansion of the said attachment assembly, said anchor bolt (1) having a flange-like engagement part (5) at said trailing end thereof extending transversely of the setting direction and outwardly from said outside surface, said attachment assembly having a preassembled state, an inserted state inserted into a borehole prior to expansion and an expanded insertion state within the borehole, said expansion wedge (2) being secured to said anchor bolt (1) in the preassembled state with an axially extending trailing end section (14) thereof extending opposite to the setting direction axially outwardly from said flange-like engagement part (5), said engagement part (5) having an axially extending throughbore (3) for receiving said expansion wedge (2) in the preassembled state, and means on said trailing end section (14) of said expansion wedge for retaining said expansion wedge in a press fit in said throughbore in the expanded insertion state, and said means comprises a radial projection on said trailing end section (14) of the said expansion wedge (2) being located at least partially radially outwardly from an axially extending projection of the throughbore (3) outwardly from the trailing end of said anchor bolt (1) in the preassembled state.

2. Attachment assembly, as set forth in claim 1, wherein said radial projection on said expansion wedge (2) projects radially outwardly from the axial projection of said throughbore and extends from the axial projection of said throughbore (3) by approximately 10 μm to 50 μm.

3. Attachment assembly, as set forth in claim 2, wherein said radial projection on said expansion wedge (2) at the trailing end thereof extending outwardly from said engagement part (5) continuously widens radially outwardly adjacent and towards the trailing end (8) thereof.

4. Attachment assembly, as set forth in claim 1 or 2, wherein the trailing end section (14) of the said expansion wedge (2) has at least one radially outwardly extending projection (15).

5. Attachment assembly, as set forth in claim 4, wherein two said projections (15) formed in a lug-like manner are located essentially opposite one another at a largest diameter of said trailing end section (14) of the said expansion wedge (2).

6. Attachment assembly, as set forth in claim 5, wherein the trailing end section (14) of the said expansion wedge (2) comprises at least one additional projection (16) forwardly in the setting direction (S) from said projection (15) and firmly pressed against the surface of the said throughbore (3) in the preassembled state.

7. Attachment assembly, as set forth in claim 6, wherein two said additional projections (16) are formed on said axially extending trailing end section (14) of said expansion wedge (2) and said additional projections (16) are overlapped radially by said projections (15) whereby the projections (15) project radially outwardly beyond the additional projections (16) by approximately 10 μm to 25 μm.

8. Attachment assembly, as set forth in claim 1 or 2, wherein said expansion wedge (2) having an axially extending concavely shaped surface arranged to face said anchor bolt in the preassembled expanded state and contacting said anchor bolt (1) only at a leading end region (7) and a trailing end region (6) thereof.

* * * * *